US012695952B2

(12) United States Patent (10) Patent No.: US 12,695,952 B2
Zhu (45) Date of Patent: Jul. 28, 2026

(54) INTERACTIVE CONTROL METHOD FOR VIRTUAL LIVE-STREAMING ROOM, AND STORAGE MEDIUM, AND ELECTRONIC DEVICE THEREOF

(71) Applicant: Guangzhou Boguan Telecommunication Technology Co., Ltd., Guangzhou (CN)

(72) Inventor: Xiaodong Zhu, Guangzhou (CN)

(73) Assignee: Guangzhou Boguan Telecommunication Technology Co., Ltd., Guangzhou city (CN)

( * ) Notice: Subject to any disclaimer, the term of this patent is extended or adjusted under 35 U.S.C. 154(b) by 25 days.

(21) Appl. No.: 18/571,770

(22) PCT Filed: May 6, 2022

(86) PCT No.: PCT/CN2022/091218
§ 371 (c)(1),
(2) Date: Dec. 19, 2023

(87) PCT Pub. No.: WO2023/005315
PCT Pub. Date: Feb. 2, 2023

(65) Prior Publication Data
US 2024/0364972 A1     Oct. 31, 2024

(30) Foreign Application Priority Data

Jul. 28, 2021     (CN) .......................... 202110857974.1

(51) Int. Cl.
*H04N 21/4725* (2011.01)
*H04N 21/2187* (2011.01)
*H04N 21/478* (2011.01)
(52) U.S. Cl.
CPC ..... *H04N 21/4725* (2013.01); *H04N 21/2187* (2013.01); *H04N 21/47815* (2013.01)

(58) Field of Classification Search
CPC ........... H04N 21/4725; H04N 21/2187; H04N 21/47815
See application file for complete search history.

(56) References Cited

U.S. PATENT DOCUMENTS

| | | | |
|---|---|---|---|
| 11,120,293 B1 * | 9/2021 | Rosenzweig | ........... G06T 7/215 |
| 2021/0117653 A1 * | 4/2021 | Cho | ........................ G06V 10/75 |
| 2022/0076315 A1 * | 3/2022 | Angeli | ............... G06Q 30/0257 |

FOREIGN PATENT DOCUMENTS

| | | |
|---|---|---|
| CN | 105869007 A | 8/2016 |
| CN | 108124184 A | 6/2018 |

(Continued)

OTHER PUBLICATIONS

International Search Report dated Jul. 12, 2022 for PCT Application No. PCT/CN2022/091218.

(Continued)

*Primary Examiner* — Nnenna N Ekpo
(74) *Attorney, Agent, or Firm* — Qinghong Xu

(57) ABSTRACT

An interactive control method for a virtual live-streaming room, a storage medium and an electronic device are provided, and the method includes: providing a live-streaming screen of the virtual live-streaming room on a graphical user interface; acquiring an image matching result, where the image matching result is a result acquired by comparing the live-streaming screen with a pre-stored item image; determining a target item successfully matched in the live-streaming screen according to the image matching result; setting a region associated with the target item in the live-streaming screen as an interactive response region; and in response to an interactive operation on the interactive response region, triggering an interactive interface corresponding to the target item.

18 Claims, 7 Drawing Sheets

(56)                    References Cited

FOREIGN PATENT DOCUMENTS

| CN | 110139161 A | 8/2019 |
| CN | 110460872 A | 11/2019 |
| CN | 110881134 A | 3/2020 |
| CN | 111652678 A | 9/2020 |
| CN | 111950425 A | 11/2020 |
| CN | 112449211 A | 3/2021 |
| CN | 112533014 A | 3/2021 |
| CN | 112818674 A | 5/2021 |
| CN | 113115061 A | 7/2021 |
| CN | 113129045 A | 7/2021 |
| CN | 113596496 A | 11/2021 |

OTHER PUBLICATIONS

1st Office Action dated May 26, 2023 for Chinese Patent No. 202110857974.1.
2nd Office Action dated Nov. 28, 2023 for Chinese Patent No. 202110857974.1.

* cited by examiner

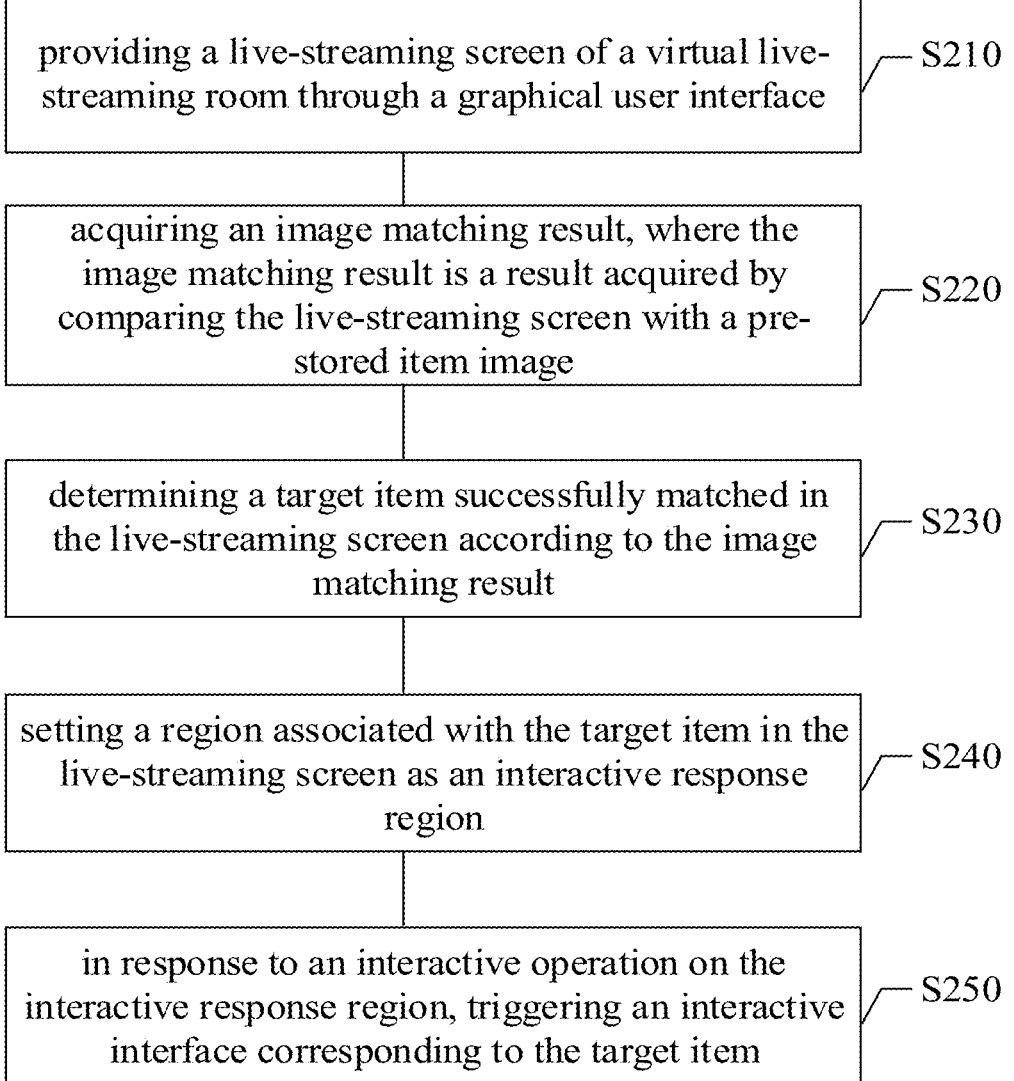

providing a live-streaming screen of a virtual live-streaming room through a graphical user interface   S210 acquiring an image matching result, where the image matching result is a result acquired by comparing the live-streaming screen with a pre-stored item image   S220 determining a target item successfully matched in the live-streaming screen according to the image matching result   S230 setting a region associated with the target item in the live-streaming screen as an interactive response region   S240 in response to an interactive operation on the interactive response region, triggering an interactive interface corresponding to the target item   S250

FIG. 2

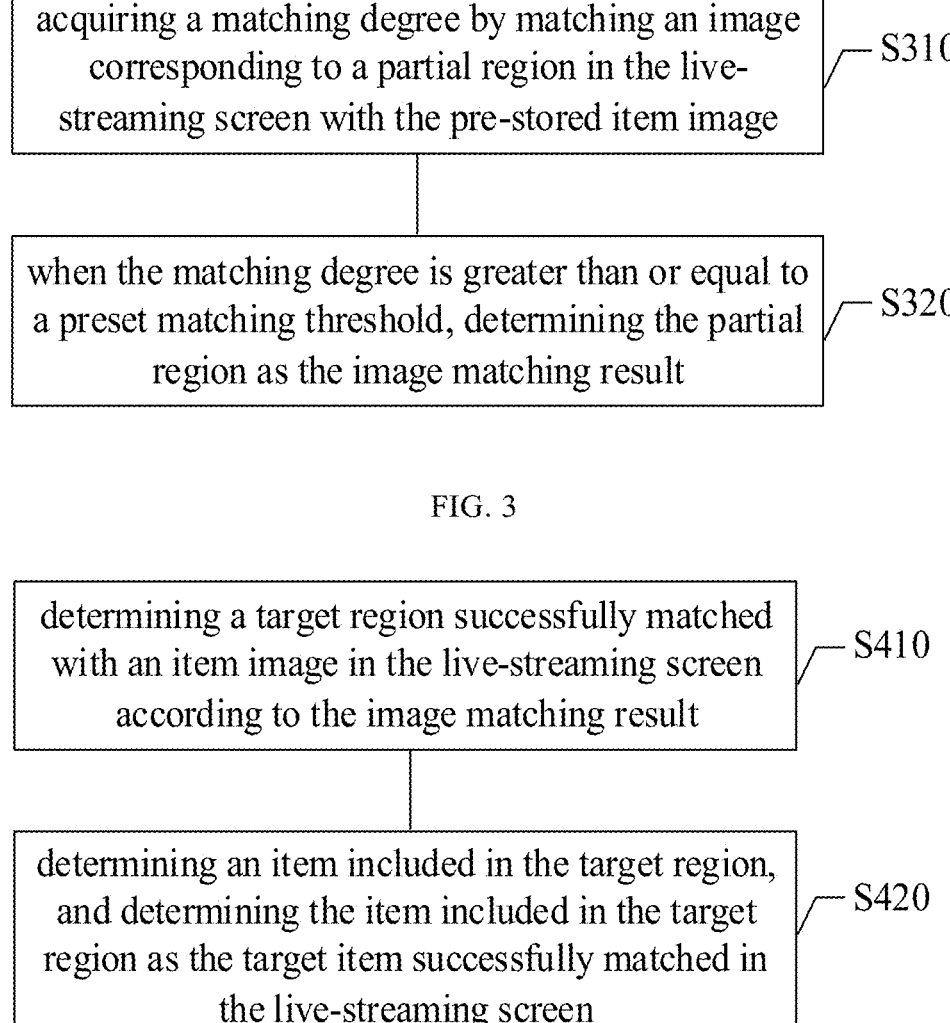

acquiring a matching degree by matching an image corresponding to a partial region in the live-streaming screen with the pre-stored item image ╱— S310 when the matching degree is greater than or equal to a preset matching threshold, determining the partial region as the image matching result ╱— S320

FIG. 3 determining a target region successfully matched with an item image in the live-streaming screen according to the image matching result ╱— S410 determining an item included in the target region, and determining the item included in the target region as the target item successfully matched in the live-streaming screen ╱— S420

FIG. 4 live-streamer side                    audience side

INTERACTIVE CONTROL METHOD FOR VIRTUAL LIVE-STREAMING ROOM, AND STORAGE MEDIUM, AND ELECTRONIC DEVICE THEREOF

CROSS-REFERENCE TO RELATED APPLICATIONS

The present disclosure is the U.S. National Phase Application of PCT International Application No. PCT/CN2022/091218, filed on May 6, 2022, which is based on and claims priority to Chinese Patent Application No. 202110857974.1, entitled "INTERACTION CONTROL METHOD AND APPARATUS FOR VIRTUAL LIVE STREAMING ROOM, MEDIUM, AND ELECTRONIC DEVICE", filed on Jul. 28, 2021, the entire content of both of which are incorporated herein by reference for all purposes.

TECHNICAL FIELD

The present disclosure relates to a field of computers, and more particularly to an interactive control method and apparatus for a virtual live-streaming room, a medium and an electronic device.

BACKGROUND

With the rapid development of Internet technology, network live stream has also emerged, and more and more live streamers set up virtual live-streaming rooms in a live-streaming platform to display live-streaming content. At present, the live stream has a good prospect in a field of product promotion. For example, the live streamer may recommend a product to an audience in the virtual live-streaming room, and the audience may purchase under the influence of the live streamer.

It should be noted that the above-mentioned information disclosed in the BACKGROUND section is only used to enhance the understanding of the background of the present disclosure, and therefore it may include information that does not constitute the information of the related art known to those skilled in the art.

SUMMARY

The present disclosure provides an interactive control method for a virtual live-streaming room, a computer-readable storage medium and an electronic device.

According to a first aspect of the present disclosure, an interactive control method for a virtual live-streaming room is provided and includes: providing a live-streaming screen of the virtual live-streaming room on a graphical user interface; acquiring an image matching result, where the image matching result is a result acquired by comparing the live-streaming screen with a pre-stored item image; determining a target item successfully matched in the live-streaming screen according to the image matching result; wherein the target item is displayed in the live-streaming screen, and the target item is an item in a region, of the live-streaming screen, matched with the pre-stored item image; setting a region associated with the target item in the live-streaming screen as an interactive response region; and in response to an interactive operation on the interactive response region, triggering an interactive interface corresponding to the target item.

According to a second aspect of the present disclosure, a non-transitory computer-readable storage medium having a computer program stored thereon, where when performing the computer program, a processor implements the interactive control method for the virtual live-streaming room according to the first aspect of the above embodiments.

According to a third aspect of the present disclosure, an electronic device is provided and includes a processor; and a memory, configured to store one or a plurality of programs, when performing the one or the plurality of programs, one or more processor implements the interactive control method for the virtual live-streaming room according to the first aspect of the above embodiments.

It should be understood that the above general description and the following detailed description are only exemplary and explanatory and should not limit the present disclosure.

BRIEF DESCRIPTION OF THE DRAWINGS

The drawings herein are incorporated into the specification and constitute a part of the specification, show embodiments that conform to the present disclosure, and are used together with the specification to explain the principles of the present disclosure. Obviously, the drawings in the following description are only some embodiments of the present disclosure. For those of ordinary skill in the art, without paying any creative work, other drawings may also be obtained based on these drawings.

FIG. 2 schematically shows a flowchart of an interactive control method for a virtual live-streaming in an embodiment of the present disclosure;

FIG. 3 schematically shows a flowchart for determining a partial region as an image matching result when a matching degree is greater than or equal to a preset matching threshold in an embodiment of the present disclosure;

FIG. 4 schematically shows a flowchart for determining an item included in a target region, and determining the item included in the target region as a target item successfully matched in a live-streaming screen in an embodiment of the present disclosure;

DETAILED DESCRIPTION

Figure 1:
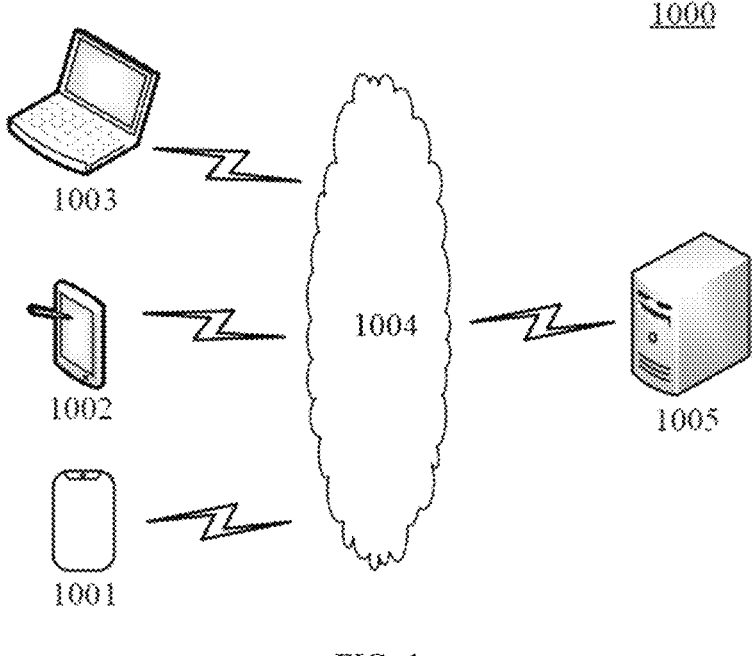
FIG. 1 schematically shows a schematic diagram of an system architecture to which an interactive control method for a virtual live-streaming room of an embodiment of the present disclosure may be applied.

Exemplary implementations are described comprehensively with reference to the accompanying drawings. However, the exemplary implementations may be implemented in a plurality of forms, and are not limited to the examples described herein. On the contrary, such implementations are provided to make the present disclosure more comprehensive and complete, and fully convey the concepts of the exemplary implementations to a person skilled in the art. In addition, the described features, structures, or characteristics may be combined in one or more embodiments in any appropriate manner. In the following descriptions, a lot of specific details are provided to give a comprehensive understanding of the embodiments of the present disclosure. However, a person of skill in the art is to be aware that, the technical solutions in the present disclosure may be implemented without one or more of the particular details, or another method, element, material, apparatus, step, and the like may be used. In other cases, well-known methods, apparatuses, implementations, or operations are not shown or described in detail, in order not to obscure the aspects of the present disclosure.

The block diagrams shown in the accompanying drawings is merely a functional entity and does not necessarily correspond to a physically independent entity. To be specific, such functional entities may be implemented in the form of software, or implemented in one or more hardware modules or integrated circuits, or implemented in different networks and/or processor apparatuses and/or microcontroller apparatuses.

With the development of the Internet industry, a live-streaming industry has also developed rapidly. There may be various types of live streams in a live-streaming platform, such as a game live stream, a live-streaming commerce, a dance live stream, a handiwork live stream and the like. Due to the rapid development of the e-commerce industry, more and more people begin to choose online shopping, and therefore, items may be promoted through the live stream to increase product sales.

In some related art, when the live streamer introduces a product to the audience, a product link may be displayed in the virtual live-streaming room, the products may be introduced in an order of the product links, after each introduction of the product, a corresponding product link may be hidden, or a plurality of product links may be combined, when the live streamer introduces the product to the audience, the live streamer informs the audience of the location or the number of the product link, and the audience may search for the product link that he/she needs among the plurality of links. The audience may click the product link to jump to a corresponding trading platform to purchase the product.

In the related art, a purchase link of a product may be preset, during the live stream, a live streamer introduces the product to an audience, a purchase link corresponding to a current product may be set in a virtual live-streaming room, and the audience may jump to an item trading platform of the product for purchase by clicking the purchase link. After the current product introduction is completed, it may be set to switch the product link; or a plurality of purchase links of products may be integrated together, when a user wants to purchase a certain product introduced by the live streamer, he/she may click an integration logo to search for the product link that he/she needs among the plurality of purchase links of products, to jump to the item trading platform of the product by clicking the purchase link.

However, in the related art, while introducing the product, the live streamer needs to pay attention to the display of the product link, and needs to switch the product link in time or inform the audience of a link status (a number, and the like), which is relatively inconvenient; for the audience, he/she needs to pay continuous attention to the live-streaming content to avoid missing a real-time status of the product link (such as a link retention time, a link number, and the like). The audience needs to search for a link corresponding to the product and jump to an item trading platform for purchase, which is relatively inconvenient, and since the live-streaming interface is separated from a purchase interface, it is not intuitive enough to watch the live stream, resulting in poor experience of the audience. For the live streamer, the live streamer needs to pay attention to the display of product link while introducing the product. For example, the live streamer changes another product for introduction after introducing one product, thus the live streamer needs to update the product link in time and inform the audience of a location of the link, and if the live streamer forgets to update the product link, the sales of the current product may be affected. For the live streamer, the operation is inconvenient and may cause certain losses. For the audience, he/she needs to pay continuous attention to the live-streaming content to avoid missing a real-time status of the product link. For example, the live streamer informs the audience that the purchase link of the currently introduced product is the XX number, and if the audience fails to receive this message, the audience cannot quickly find the corresponding purchase link of the current product, and needs to search for it in the plurality of links, which is inconvenient, and increases the time cost of the audience, thereby in turn leading to a reduction in the purchasing desire of the audience and the poor experience, and affecting the product sales.

In addition, in the related technical solution, the user may jumps from the current virtual live-streaming room to the item trading platform after clicking the purchase link of the item, which may cause a live-streaming scene to be separated from a purchase scene, and the user cannot pay attention to the live-streaming content at all times, which leads to the reduction of the product sales.

The present embodiment provides an interactive control solution for a virtual live-streaming room, and the virtual live-streaming room of this solution may be set up on a variety of terminal devices. The virtual live-streaming room may include a web version of the virtual live-streaming room, and may also include a live-streaming software. The terminal device may be an electronic device with a display screen, such as a computer, a tablet computer, a smart phone, and the like, or a terminal device such as a game console, a VR device, and the like, including a memory configured for storing data and a processor configured for data processing, the live-streaming software is installed through the memory, and the processor executes a program corresponding to the live-streaming software to implement the operation of the live-streaming software on the terminal device.

FIG. 1 shows a schematic diagram of an system architecture to which an interactive control method for a virtual live-streaming room of an embodiment of the present disclosure may be applied.

As shown in FIG. 1, the system architecture 100 may include one or more of terminal devices 1001, 1002, and 1003, a network 1004, and a server 1005. The network 1004 is a medium configured to provide communication links between the terminal devices 1001, 1002, and 1003, and the server 1005. The network 1004 may include various connection types, such as a wired communication link, a wireless communication link, or a fiber optic cable.

It should be understood that the quantity of terminal devices, the quantity of networks, and the quantity of servers in FIG. 1 are merely illustrative. There may be any quantity of terminal devices, any quantity of networks, and any quantity of servers according to an implementation requirement. For example, the server 1005 may be a server cluster including a plurality of servers or the like.

A user may interact with the server 1005 through the network 1004 by using the terminal devices 1001, 1002, and 1003, to receive or send messages. The terminal devices 1001, 1002, and 1003 may be various electronic devices having display screens, including, but not limited to, smartphones, tablet computers, portable computers, desktop computers, digital cinema projectors, and the like. The server 1005 may be a server configured to provide various services.

In an embodiment, an execution subject of the interactive control method for the virtual live-streaming room of the present disclosure may be the server 1005, and the server 1005 may acquire an image matching result sent by the terminal devices 1001, 1002 and 1003, and determine a target item successfully matched in the live-streaming screen according to the interactive control method for the virtual live-streaming room of the present disclosure, and set a region associated with the target item in the live-streaming screen as an interactive response region, in response to an interactive operation on the interactive response region, trigger an interactive interface corresponding to the target item. In addition, the interactive control method for the virtual live-streaming room of the present disclosure may also be implemented through the terminal devices 1001, 1002, 1003, and the like, to achieve the process of creating the interactive response region according to the image matching result, and to achieve the process of triggering the interactive interface corresponding to the target item according to the interactive operation on the interactive response region.

In addition, the implementation process of the interactive control method for the virtual live-streaming room of the present disclosure may also be implemented by the terminal devices 1001, 1002, 1003 and the server 1005 together. For example, the terminal devices 1001, 1002 and 1003 may acquire the image matching result, then send the acquired image matching result to the server 1005, such that the server 1005 may determine the target item successfully matched in the live-streaming screen according to the image matching result, and set the region associated with the target item in the live-streaming screen as the interactive response region, in response to the interactive operation on the interactive response region, trigger the interactive interface corresponding to the target item.

In an embodiment of the present disclosure, the live-streaming screen in the virtual live-streaming room may be provided on a graphical user interface, to acquire the image matching result, the image matching result is the result acquired by comparing the live-streaming screen with a pre-stored item image, according to the image matching result, the target item successfully matched in the live-streaming screen may be determined, and the region associated with the target item in the live-streaming screen may be set as the interactive response region, in response to the interactive operation on the interactive response region, the interactive interface corresponding to the target item is triggered. Referring to FIG. 2, it shows a flowchart of the interactive control method for the virtual live-streaming room in the embodiment, which may include the following steps S210 to S250:

in step S210: a live-streaming screen of the virtual live-streaming room is provided on a graphical user interface;

in step S220: an image matching result is acquired, where the image matching result is a result acquired by comparing the live-streaming screen with a pre-stored item image;

in step S230: a target item successfully matched in the live-streaming screen is determined according to the image matching result;

in step S240: a region associated with the target item in the live-streaming screen is set as an interactive response region;

in step S250: in response to an interactive operation on the interactive response region, an interactive interface corresponding to the target item is triggered.

In the interactive control method for the virtual live-streaming room provided by the embodiment of the present disclosure, the region associated with the target item in the live-streaming screen may be set as the interactive response region according to the image matching result, and the interactive interface corresponding to the target item may be triggered. On the one hand, the operation of the live streamer may be simplified, and it is unnecessary to pay attention to the link status of the item, so as to reduce the time consumption of the live streamer in introducing the product link, thereby improving a product promotion efficiency of the live streamer, and thus enhancing the experience of the live streamer; on the other hand, the audience does not need to pay continuous attention to the real-time status of the link, such that the audience may focus on the live streamer's introduction to the item without searching for a required link among the plurality of links, which greatly saves the time consumption of the audience; moreover, the audience may complete the purchase of the item in the virtual live-streaming room, so as to avoid the separation between the live-streaming scene and the purchase scene, thereby improving the use experience of the audience and thus increasing the purchasing desire of the audience. Next, the steps S210 to S250 of the interactive control method for the virtual live-streaming in the embodiment are described in more detail in combination with FIG. 2 and the embodiment.

in step S210: a live-streaming screen of the virtual live-streaming room is provided on a graphical user interface;

In an embodiment of the present disclosure, the live-streaming screen of the virtual live-streaming room may be provided through the graphical user interface. Specifically, before the live stream is performed, the live streamer may place a plurality of items to be introduced in the live-streaming screen corresponding to the virtual live-streaming room, and may display the plurality of items through the live-streaming screen of the virtual live-streaming room.

in step S220: an image matching result is acquired, where the image matching result is a result acquired by comparing the live-streaming screen with a pre-stored item image;

In an embodiment of the present disclosure, the image matching result may be acquired. Specifically, the image matching result is the result acquired by comparing the live-streaming screen with the pre-stored item image. The pre-stored item image may be collected by a variety of image acquisition devices, such as camcorders, cameras, or other camera modules. For example, a camera may be adopted to collect a pre-stored item image of an item, the camera is a video input device, has basic functions of video recording/transmission and static image capture, and after the lens collects an image, it processes an image through a photosensitive component circuit and a control component in the camera, converts it into a digital signal that may be recognized by a computer, then inputs the digital signal to the computer through a parallel port or a USB connection, and restores the image by a software.

Further, when collecting the pre-stored item image of the item, the pre-stored item image of the item may be directly collected; or the pre-stored item image of the item may be collected and then cropped, so as to obtain a pre-stored item image corresponding to each item. The present disclosure does not specifically limit the source and acquisition manner of the pre-stored item image.

Further, the pre-stored item image of the item may include processed image information or unprocessed image information. For example, the pre-stored item image of the item may be processed, saturation, curve, color value, contrast, sharpening, and the like of the image information may be adjusted, so to to may make the pre-stored item image of the item more clearer, and avoid problems of unclear pre-stored item image caused by the light, the movement of the collector when collecting the pre-stored item image of the item, and the like. In addition, the pre-stored item image of the item may also be matted to remove a background of the pre-stored item image of the item, so as to facilitate the processing of the pre-stored item image of the item in a subsequent step. It should be noted that the present disclosure does not specifically limit the status of the pre-stored item image.

Further, the virtual live-streaming room is correspondingly provided with a live streamer side client, and before acquiring the image matching result, where the image matching result is the result acquired by comparing the live-streaming screen with the pre-stored item image, the item image may be uploaded in response to an upload operation for an item image. Specifically, the live streamer may upload the pre-stored item image acquired through the above steps to the server corresponding to the virtual live-streaming room, when the solution of the present disclosure is applied, the image matching result may be acquired by comparing the item image uploaded by a live streamer with the live-streaming screen. The image upload operation of the live streamer side client may include a touch operation, an external device operation, a voice operation, and the like. For example, the touch operation may include a sliding touch operation, a press touch operation, a gesture touch operation, a long-press touch operation, a click touch operation, a drag touch operation, an air touch operation, and the like; and the external device operation may include a mouse click, a keyboard input, a console key input, and the like. It should be noted that the present disclosure does not specifically limit a specific form of the image upload operation.

The image upload operation of the live streamer side client may include one operation or a plurality of operations. For example, a plurality of pre-stored item images required to be uploaded may be selected by clicking the touch operation, and the plurality of selected pre-stored item images are uploaded by clicking the touch operation. It should be noted that the present disclosure does not specifically limit the number of image upload operations of the live streamer side client.

Further, the live streamer side client may upload item information and/or an item link corresponding to the item image in response to the upload operation for the item information and/or the item link corresponding to the item image. Specifically, the item link may be set to open an item details interface, an item purchase interface, an item browse interface, and the like of the item; the item information may include an item price, an item type, an item weight, and the like. It should be noted that the present disclosure does not specifically limit the specific content of the item link and the item information.

In an embodiment of the present disclosure, the live-streaming screen may be compared with the pre-stored item image to acquire the image matching result. Specifically, an overall live-streaming screen may be compared with the pre-stored item image, or a portion of the live-streaming screen may be compared with the pre-stored item image. The image matching result may include a matching degree, and the like. It should be noted that the present disclosure does not specifically limit the specific manner for comparing the live-streaming screen with the item image pre-stored by the user.

Further, before comparing the live-streaming screen with the pre-stored item image, an item screen corresponding to an item in the virtual live-streaming room may be detected. Specifically, before the live stream is performed, the live streamer may place a plurality of items to be introduced in the live-streaming screen corresponding to the virtual live-streaming room, and the item screen corresponding to the item in the virtual live-streaming room may be detected after the live stream is started. Specifically, the live-streaming screen may be monitored in real time, and the item screen of the item is recognized in the live-streaming screen. The item screen in the live-streaming screen may be recognized through a commodity identification technology, which is mainly used in the process of commodity circulation, especially in a field of unmanned retail such as unmanned shelves and intelligent retail cabinets, and the live-streaming screen may be processed, analyzed, and comprehended using the computer, to recognize items with different modes. For example, detection of the item screen may be divided into steps such as an image acquisition, an image preprocessing, a feature extraction, an image recognition and the like. It should be noted that the present disclosure does not specifically limit the method for detecting the item screen.

The comparison may be performed by an image matching technology, and the image matching technology may acquire similar items by analyzing a corresponding relationship, similarity and consistency of image content, features, structures, relationships, textures and grayscale and the like.

For example, the matching process may be performed by means of grayscale matching, and the matching relationship between two images may be determined by using similarity measures, such as a correlation function, a covariance function, a sum of squares of difference, a sum of absolute difference and an extreme value of equal measure, for example, a mean absolute differences algorithm (MAD, Mean Absolute Differences), a sum of absolute differences algorithm (SAD, Sum of Absolute Differences), a sum of squared differences algorithm (SSD, Sum of Squared Difference), a mean square differences algorithm (MSD, Mean Square Differences), a normalized cross correlation algorithm (NCC, Normalized Cross Correlation), and the like; the matching process may also be performed by means of feature matching, where the feature matching first preprocesses the image to extract its high-level features, then establishes the matching corresponding relationship between features of the two images, and the commonly used feature primitives include a point feature, an edge features and a regional feature, such as a scale invariant feature transformation matching algorithm (SIFT, Scale Invariant Feature Transform), and the like. It should be noted that the present disclosure does not specifically limit the method for determining whether the item screen in the virtual live-streaming room is able to be matched with the item image information.

In an embodiment of the present disclosure, the item screen corresponding to an item selection instruction may be detected in the live-streaming screen in response to the item selection instruction of the live streamer, and the image matching result may be obtained by comparing the item screen with the pre-stored item image. Specifically, the item selection instruction may be set to indicate the item to be selected by the live streamer, and during the detection, only the item corresponding to the item selection instruction is detected, where the item selection instruction may include inputting a picture, inputting an item code, inputting an item name, and the like. It should be noted that the present disclosure does not specifically limit the form of the item selection instruction.

For example, the live streamer may input the item name (such as a hat A), when the live-streaming screen of the virtual live-streaming room is detected, only the item screen corresponding to the hat A in the virtual live-streaming room is detected. This may avoid detecting the item screens corresponding to a plurality of items at one time, so as to improve the targeting of the live streamer when introducing the item.

In an embodiment of the present disclosure, feature data corresponding to the virtual live-streaming room may be acquired. Specifically, the feature data corresponding to the virtual live-streaming room may include data that indicates the product characteristic in the virtual live-streaming room. For example, the feature data corresponding to the virtual live-streaming room may include a name of the virtual live-streaming room, a name of the live streamer, an audio signal of the live streamer, chat content of the virtual live-streaming room, words in the live-streaming screen, and the like. It should be noted that the present disclosure does not specifically limit the form of feature data corresponding to the virtual live-streaming room. After the feature data corresponding to the virtual live-streaming room is acquired, the item screen corresponding to the feature data may be detected in the virtual live-streaming room according to the feature data. For example, when the acquired feature data is the name of the virtual live-streaming room, the item screen corresponding to the feature data may be detected in the virtual live-streaming room according to the name of the virtual live-streaming room. For example, when the name of the virtual live-streaming room is "XX refrigerator promotion", the item screen of the XX refrigerator may be detected in the virtual live-streaming room according to the XX refrigerator promotion; For another example, when the acquired feature data is the chat content of the virtual live-streaming room, the item screen corresponding to the chat content of the virtual live-streaming room may be detected in the virtual live-streaming room according to the chat content of the virtual live-streaming room. For example, when the chat content of the virtual live-streaming room is "look at XX model mobile phone", the item screen of the XX model mobile phone may be detected in the virtual live-streaming room according to the look at XX model mobile phone.

in step S230: a target item successfully matched in the live-streaming screen is determined according to the image matching result;

In an embodiment of the present disclosure, after the image matching result is acquired according to the above steps, the target item successfully matched in the live-streaming screen may be determined according to the image matching result. Specifically, a corresponding matching threshold may be set according to the above matching method, when the image matching result is greater than the corresponding matching threshold, the target item successfully matched in the live-streaming screen is determined. It should be noted that the present disclosure does not specifically limit the specific manner for determining the target item successfully matched in the live-streaming screen according to the image matching result.

In an embodiment of the present disclosure, an image corresponding to a partial region in the live-streaming screen may be matched with the pre-stored item image to acquire a matching degree, when the matching degree is greater than or equal to a preset matching threshold, the partial region is determined as the image matching result. Referring to FIG. 3, when the matching degree is greater than or equal to the preset matching threshold, determining the partial region as the image matching result may include the following steps S310 to S320:

in step S310, a matching degree is acquired by matching an image corresponding to a partial region in the live-streaming screen with the pre-stored item image;

In an embodiment of the present disclosure, the image corresponding to the partial region in the live-streaming screen is matched with the pre-stored item image to acquire the matching degree. Specifically, the matching degree between the image corresponding to the partial region in the live-streaming screen and the pre-stored item image may be set to indicate the similarity between the image corresponding to the partial region in the live-streaming screen and the pre-stored item image, and may be set to indicate whether an item corresponding to the image that corresponds to the partial region in the live-streaming screen and an item corresponding to the pre-stored item image are items of the same style (or model). It should be noted that the present disclosure does not specifically limit the manner for acquiring the matching degree between the image corresponding to the partial region in the live-streaming screen and the pre-stored item image.

in step S320, when the matching degree is greater than or equal to a preset matching threshold, the partial region is determined as the image matching result.

In an embodiment of the present disclosure, a preset matching threshold may be acquired, and when the matching degree is greater than or equal to the preset matching threshold, the partial region is determined as the image matching result. Specifically, when the matching degree between the image corresponding to the partial region in the live-streaming screen and the pre-stored item image is greater than or equal to the preset matching threshold, the image corresponding to the partial region in the live-streaming screen matches the pre-stored item image, it may indicate whether the item corresponding to the item screen and the item corresponding to the item image information are items of the same style (or model), and that is, the partial region may be determined as the image matching result. Specifically, the preset matching threshold may be stored in the server or the terminal device in advance, when determining whether the item screen is matched with the item image information, the preset matching threshold may be called from the server or the terminal device; or, the live streamer may input the preset matching threshold, and whether the item screen is matched with the item image information is determined according to the input preset matching threshold.

In an embodiment of the present disclosure, after the matching degree of the image corresponding to the partial region in the live-streaming screen with the pre-stored item image and the preset matching threshold are acquired, whether the item screen and the item image information are matched is determined according to the preset matching threshold. Specifically, the matching degree of the image corresponding to the partial region in the live-streaming screen with the pre-stored item image may be compared with the preset matching threshold, and when the matching degree of the image corresponding to the partial region in the live-streaming screen with the pre-stored item image is greater than or equal to the preset matching threshold, the partial region may be determined as the image matching result.

Through the above steps S310 to S320, the image corresponding to the partial region in the live-streaming screen may be matched with the pre-stored item image to acquire the matching degree, and when the matching degree is greater than or equal to the preset matching threshold, the partial region may be determined as the image matching result. Since the matching degree of the partial region in the live-streaming screen and the pre-stored image may be different in different scenes, an appropriate preset matching threshold is set according to a current scene, which may improve a success rate of matching and enhance the experience of the live streamer and the experience of the audience.

In an embodiment of the present disclosure, a target region successfully matched with the item image in the live-streaming screen may be determined according to the image matching result, and the item included in the target region is determined to take the item included in the target region as the target item successfully matched in the live-streaming screen. Referring to FIG. 4, the determining the item included in the target region, and taking the item included in the target region as the target item successfully matched in the live-streaming screen may include the following steps S410 to S420:

in step S410, a target region successfully matched with an item image in the live-streaming screen is determined according to the image matching result;

in step S420, an item included in the target region is determined, and the item included in the target region is is determined as the target item successfully matched in the live-streaming screen.

In an embodiment of the present disclosure, after the image matching result is obtained through the above steps, the target region for successful image matching may be determined according to the image matching result, since the live-streaming screen is matched with the pre-stored item image during the image matching, the successfully matched target region includes the item corresponding to the pre-stored item image, and the item included in the target region may be used as the target item successfully matched in the live-streaming screen.

Through the above steps S410 to S420, the target region successfully matched with the item image in the live-streaming screen may be determined according to the image matching result, the item included in the target region may be determined, and the item included in the target region may be used as the target item in the live-streaming screen that match successfully.

in step S240: a region associated with the target item in the live-streaming screen is set as an interactive response region;

In an embodiment of the present disclosure, after the target item is determined through the above steps, the region associated with the target item in the live-streaming screen may be set as the interactive response region. Specifically, the region associated with the target item may include a region larger than a screen occupied by the item in the live-streaming screen, or the region associated with the target item may include a region smaller than a screen occupied by the item in the live-streaming screen, or the region associated with the target item may include the same region as a screen occupied by the item in the live-streaming screen. The region associated with the target item in the live-streaming screen may include various shapes, such as a circle, a square, a rectangle, an ellipse, and the like. It should be noted that the present disclosure does not specifically limit the shape of the region associated with the target item.

Figure 5:
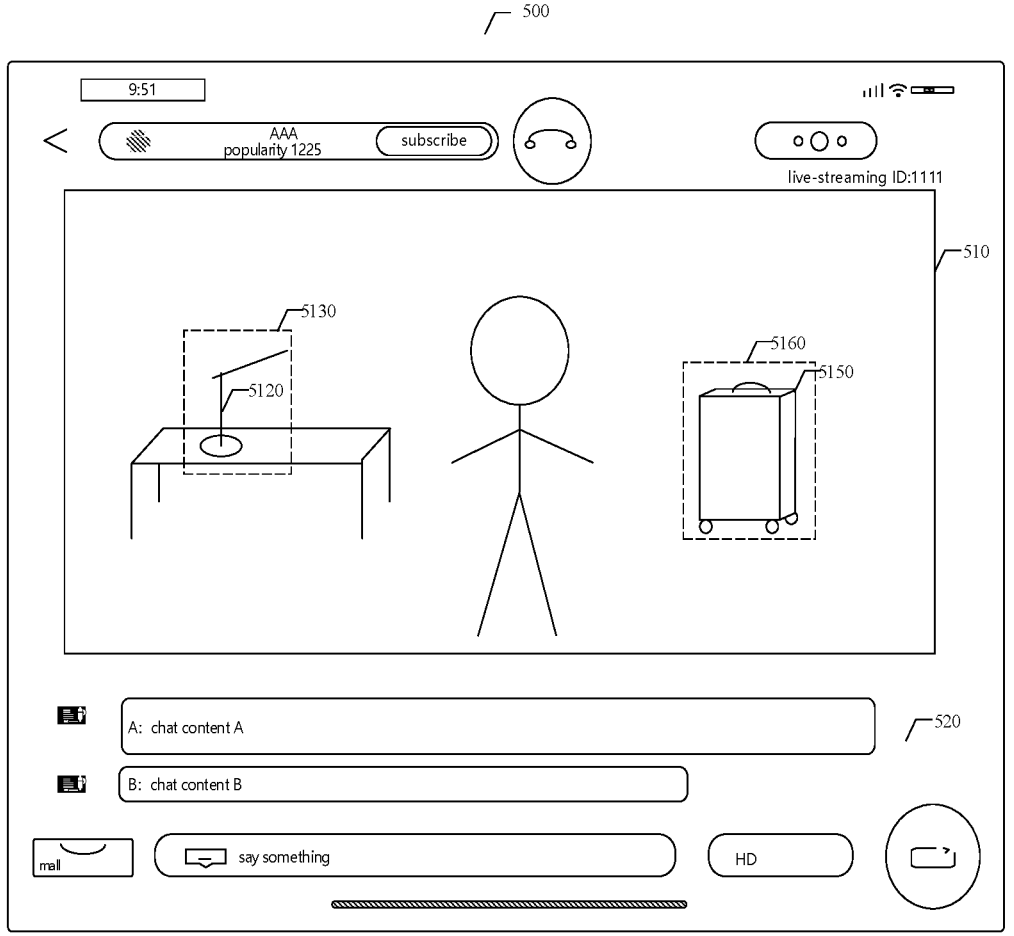
FIG. 5 schematically shows a schematic diagram that a region associated with a target item in a live-streaming screen is set as an interactive response region in an embodiment of the present disclosure.

As shown in FIG. 5, the virtual live-streaming room 500 may include a live-streaming screen 510 and a chat region 520, the live-streaming screen 510 may include an item 5120 to be introduced and an item 5150, and a region 5130 associated with the item 5120 and a region 5160 associated with the item 5150 in the live-streaming screen may be set as the interactive response region.

In an embodiment of the present disclosure, the region associated with the target item is a region occupied by the target item in the live-streaming screen.

Further, a target special effect may be displayed for the interactive response region. Specifically, the target special effect may include increment, contour identification, contrast processing, and the like. It should be noted that the present disclosure does not specifically limit the specific form of the target special effect.

in step S250: in response to an interactive operation on the interactive response region, an interactive interface corresponding to the target item is triggered.

In an embodiment of the present disclosure, the interactive interface corresponding to the target item may be triggered in response to the interactive operation on the interactive response region. Specifically, the interactive operation for the interactive response region may include a touch operation, an external device operation, a voice operation, and the like. For example, the touch operation may include a sliding touch operation, a press touch operation, a gesture touch operation, a long-press touch operation, a click touch operation, a drag touch operation, an air touch operation, and the like; and the external device operation may include a mouse click, a keyboard input, a console key input, and the like. It should be noted that the present disclosure does not specifically limit a specific form of the interactive operation for the interactive response region.

In an embodiment of the present disclosure, the interactive interface corresponding to the target item may include an image display interface of the target item, a purchase interface of the target item, a product details interface of the target item, and the like. It should be noted that the present disclosure does not specifically limit a specific type of the interactive interface corresponding to the target item.

Further, a live-streaming client may acquire interactive information corresponding to the interactive interface through a transfer SDK, and may open an interactive platform corresponding to the interactive interface in the live-streaming client. Specifically, a trigger operation for the interactive interface may be received, and an item may be acquired in the virtual live-streaming room according to the trigger operation. For example, the live-streaming client may acquire purchase information corresponding to the item purchase interface through the transfer SDK (Software Development Kit), and may directly open the purchase platform corresponding to the item in the live-streaming client, the user may directly purchase the item in the live-streaming client, and the live-streaming client may communicate with an item transaction server to complete the item purchase in the live-streaming client.

Further, after the interactive interface corresponding to the target item is triggered, in response to a trigger operation for the interactive interface, a purchase interface for the target item may be displayed to facilitate the user to purchase the item.

In an embodiment of the present disclosure, the item information corresponding to the target item may be displayed in the interactive response region. Specifically, the item information corresponding to the target item may include item-related information, such as an item name, an item price, an item profile, and the like. It should be noted that the disclosure does not specifically limit a specific type of item information corresponding to the target item and a display position in the interactive response region.

Figure 6:
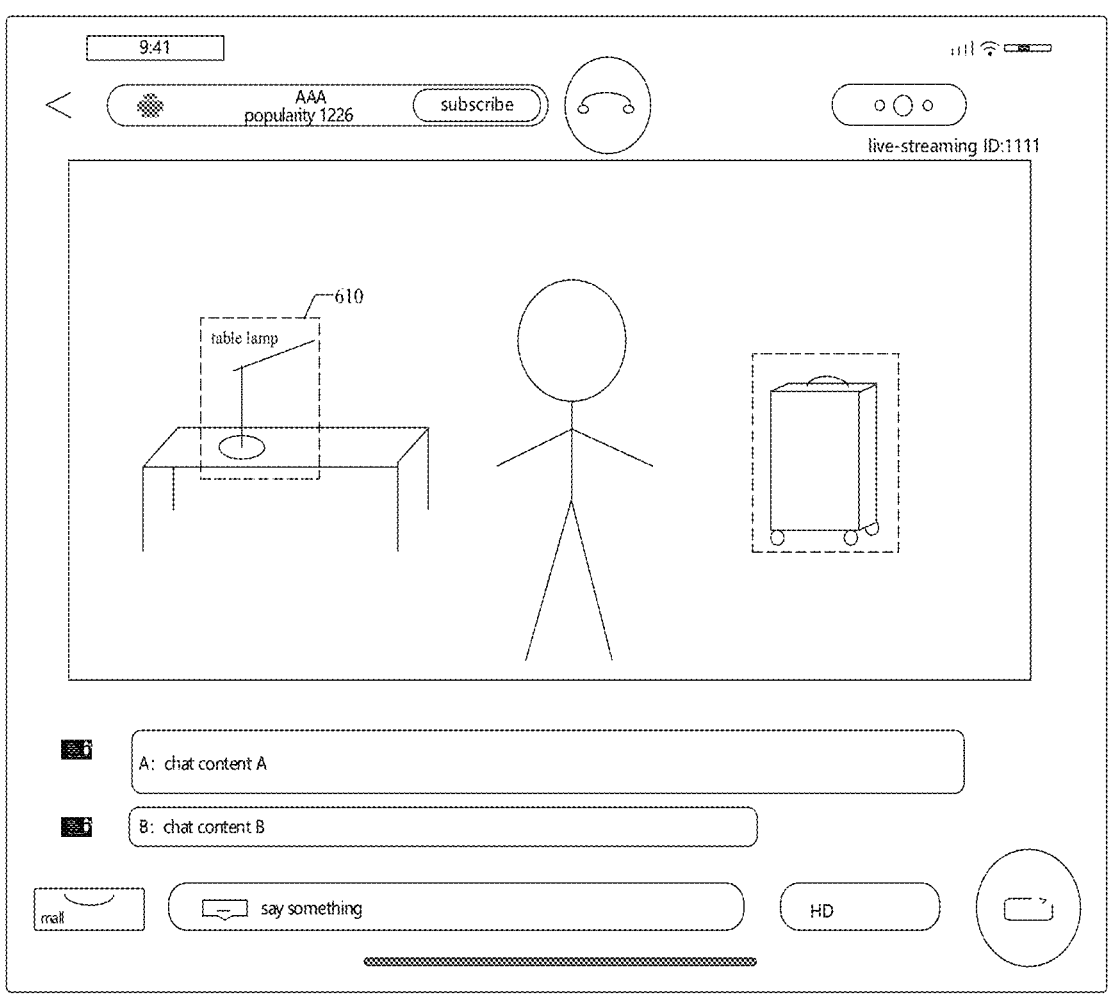
FIG. 6 schematically shows a schematic diagram of displaying item information corresponding to a target item on an interactive response region in an embodiment of the present disclosure.

For example, as shown in FIG. 6, the item name "table lamp" corresponding to the target item may be displayed in the interactive response region 610.

Figure 7:
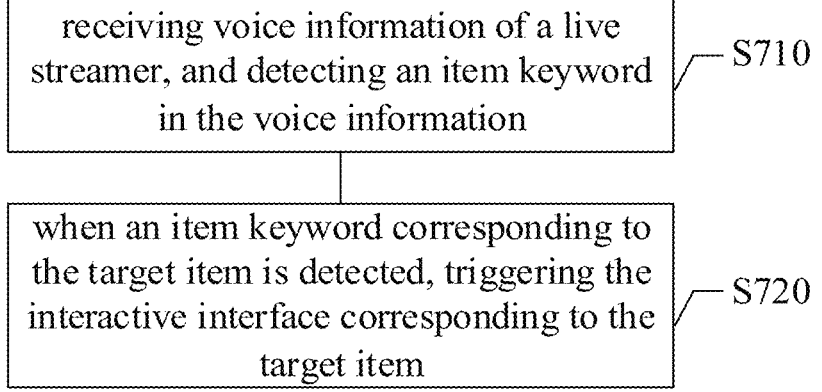
FIG. 7 schematically shows a flowchart for triggering an interactive interface corresponding to a target item when an item keyword corresponding to the target item is detected in an embodiment of the present disclosure.

In an embodiment of the present disclosure, voice information of the live streamer may be received, an item keyword in the voice information may be detected, and when an item keyword corresponding to the target item is detected, the interactive interface corresponding to the target item is triggered. As shown in FIG. 7, when the item keyword corresponding to the target item is detected, the interactive interface corresponding to the target item is triggered, which may include the following steps S710 to S720:

in step S710, voice information of a live streamer is received, and an item keyword in the voice information is detected.

In an embodiment of the present disclosure, the voice information of the live streamer may be received. Specifically, the voice information of the live streamer may be received through the terminal device corresponding to the virtual live-streaming room. For example, the terminal device corresponding to the virtual live-streaming room is a mobile phone, and thus the voice information of the live streamer may be received through a microphone on the mobile phone. After receiving the voice information from the live streamer, the item keyword in the voice information may be detected. Specifically, a voice recognition technology may be used to recognize the keyword in voice information. It should be noted that the present disclosure does not specifically limit a specific manner for detecting the item keyword in the voice information.

in step S720, when an item keyword corresponding to the target item is detected, the interactive interface corresponding to the target item is triggered.

In an embodiment of the present disclosure, when the item keyword corresponding to the target item is detected, the interactive interface corresponding to the target item may be triggered. Specifically, the item keyword corresponding to the target item may be set in advance. The item keyword corresponding to the target item may include the a name, a price, a usage manner of the item, and the like. When the item keyword is detected to be the same as the preset keyword, the interactive interface corresponding to the target item is triggered. It should be noted that the present disclosure does not specifically limit specific content of the item keyword corresponding to the target item.

For example, the live streamer may introduce various items in the live-streaming screen, and trigger the purchase interface corresponding to the table lamp when the item keyword "table lamp" corresponding to the table lamp is detected.

Through the above steps S710 to S720, the voice information of the live streamer may be received and the item keyword in the voice information is detected, when the item keyword corresponding to the target item is detected, the interactive interface corresponding to the target item may be triggered.

In an embodiment of the present disclosure, the interactive response region may also be highlighted. Specifically, in order to facilitate the audience to observe the interactive response region, the interactive response region may be highlighted. For example, the interactive response region may be marked with dotted lines, the interactive response region may also be brightened, and the interactive response region may also be blinked. It should be noted that the present disclosure does not specifically limit a specific highlighting manner.

In an embodiment of the present disclosure, for the live streamer, the pre-stored item image of the item may be uploaded first, then the item link corresponding to the pre-stored item image may be uploaded, the server saves the pre-stored item image and the item link corresponding to the pre-stored item image, and places the item to be introduced in the virtual live-streaming room, the server may send the saved pre-stored item image and the item link corresponding to the pre-stored item image to a client of the live-streaming room, the audience side may match the live-streaming screen with the pre-stored item image while watching the live content, after the match is successful, the region associated with the target item in the live-streaming screen is set as the interactive response region, the interactive response region is prompted, and after the audience clicks the interactive response region, the interactive interface corresponding to the item link may be triggered.

Figure 8:
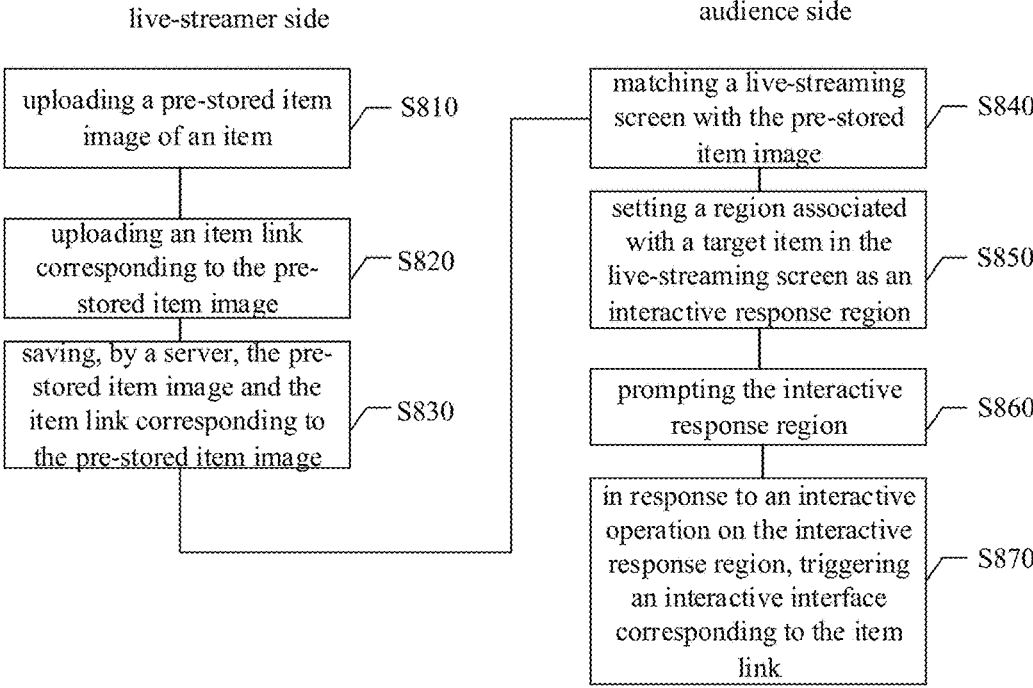
FIG. 8 schematically shows a flowchart for creating an interactive response region according to a result acquired by comparing a live-streaming screen with a pre-stored item image, triggering an interactive interface corresponding to a target item in response to an interactive operation on the interactive response region in an embodiment of the present disclosure.

The interactive response region is created by comparing the live-streaming screen with the pre-stored item image, and in response to the interactive operation on the interactive response region, the interactive interface corresponding to the target item is triggered. As shown in FIG. 8, the following steps S810 to S870 may be included:

in step S810, the pre-stored item image of the item is uploaded; in step S820, the item link corresponding to the pre-stored item image is uploaded; in step S830, the server saves the pre-stored item image and the item link corresponding to the pre-stored item image; in step S840, the live-streaming screen is matched with the pre-stored item image; in step S850, the region associated with the target item in the live-streaming screen is set as the interactive response region; in step S860, the interactive response region is prompted; in step S870, in response to the interactive operation on the interactive response region, the interactive interface corresponding to the item link is triggered.

In an embodiment of the present disclosure, the live-streaming screen in the virtual live-streaming room may be provided through the graphical user interface to acquire the image matching result, the image matching result is the result acquired by comparing the live-streaming screen with the pre-stored item image, according to the image matching result, the target item successfully matched in the live-streaming screen may be determined, and the region associated with the target item in the live-streaming screen may be set as the interactive response region, in response to the interactive operation on the interactive response region, the interactive interface corresponding to the target item is triggered.

In the interactive control method for the virtual live-streaming room provided by an embodiment of the present disclosure, the live-streaming screen may be compared with the pre-stored item image to acquire the image matching result, and the interactive response region may be created according to the image matching result, and in response to the interactive operation on the interactive response region, the interactive interface corresponding to the target item may be triggered. The item is acquired in the virtual live-streaming room according to the item image information. On the one hand, the operation of the live streamer may be simplified, and it is unnecessary to pay attention to the link status of the item, so as to reduce the time consumption of the live streamer in introducing the product link, thereby improving a product promotion efficiency of the live streamer, and thus enhancing the experience of the live streamer; on the other hand, the audience does not need to pay continuous attention to the real-time status of the link, such that the audience may focus on the live streamer's introduction to the item without searching for a required link among the plurality of links, which greatly saves the time consumption of the audience; moreover, the audience may complete the purchase of the item in the virtual live-streaming room, so as to avoid the separation between the live-streaming scene and the purchase scene, thereby improving the use experience of the audience and thus increasing the purchasing desire of the audience.

It should be noted that the above-mentioned drawings are merely schematic illustrations of processes included in the methods according to embodiments of the present disclosure, and are not intended to limit the present disclosure. It may be easily understood that the processes shown in the drawings do not indicate or limit the chronological order of these processes. In addition, it may also be easily understood that these processes may be performed synchronously or asynchronously in a plurality of modules, for example.

Figure 9:
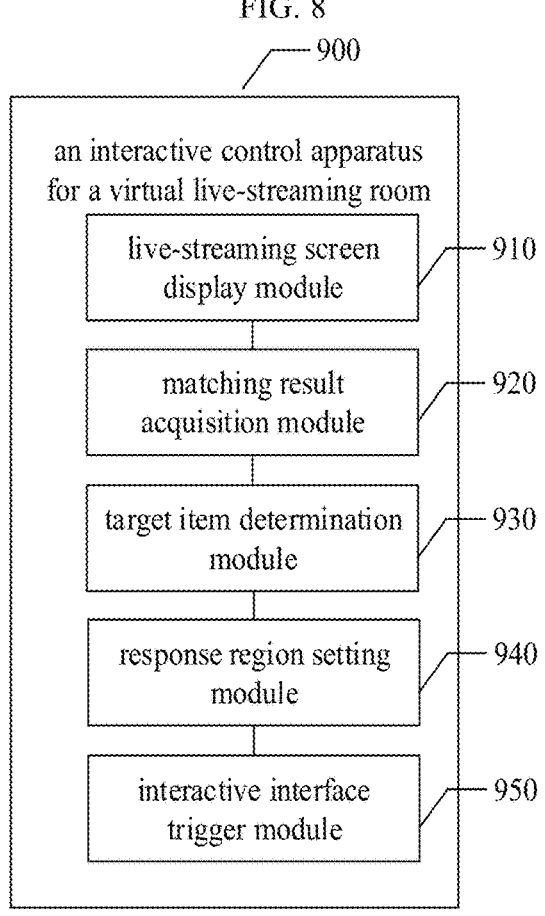
FIG. 9 schematically shows a composition diagram of an interactive control apparatus in a virtual live-streaming room in an embodiment of the present disclosure.

In addition, in an embodiment of the present disclosure, an interactive control apparatus for a virtual live-streaming room is also provided. Referring to FIG. 9, an interactive control apparatus 900 in the virtual live-streaming room includes: a live-streaming screen display module 910, a matching result acquisition module 920, a target item determination module 930, a response region setting module 940, and an interactive interface trigger module 950.

the live-streaming screen display module is configured to provide a live-streaming screen of the virtual live-streaming room on a graphical user interface; the matching result acquisition module is configured to acquire an image matching result, where the image matching result is a result acquired by comparing the live-streaming screen with a pre-stored item image; the target item determination module is configured to determine a target item successfully matched in the live-streaming screen according to the image matching result; the response region setting module is configured to set a region associated with the target item in the live-streaming screen as an interactive response region; and the interactive interface trigger module is configured to trigger an interactive interface corresponding to the target item in response to an interactive operation on the interactive response region.

In an embodiment of the present disclosure, based on the above solution, the virtual live-streaming room is correspondingly provided with a live streamer side client, and before acquiring the image matching result, where the image matching result is a result acquired by comparing the live-streaming screen with the pre-stored item image, the apparatus also includes an image upload operation response unit, configured as that the live streamer side client uploads the item image in response to an upload operation for an item image.

In an embodiment of the present disclosure, based on the above solution, the apparatus also includes an upload operation response unit, configured as that the live streamer side client uploads item information and/or an item link corresponding to the item image in response to the upload operation for the item information and/or the item link corresponding to the item image.

In an embodiment of the present disclosure, based on the above solution, the image matching result is acquired, and the apparatus also includes: a matching degree acquisition unit, configured to acquire a matching degree by matching an image corresponding to a partial region in the live-streaming screen with the pre-stored item image; a target item determination unit, configured to determine the partial region as image matching result when the matching degree is greater than or equal to a preset matching threshold.

In an embodiment of the present disclosure, based on the above solution, the target item successfully matched in the live-streaming screen is determined according to the image matching result, and the apparatus also includes: a target region determination unit, configured to determine a target region successfully matched with an item image in the live-streaming screen according to the image matching result; a target item determination unit, configured to determine an item included in the target region, and determine the item included in the target region as the target item successfully matched in the live-streaming screen.

In an embodiment of the present disclosure, based on the above solution, the interactive interface is a purchase interface for purchasing the target item.

In an embodiment of the present disclosure, based on the above solution, after triggering the interactive interface corresponding to the target item, the apparatus also includes a trigger operation response unit, configured to display a purchase interface for the target item in response to a trigger operation for the interactive interface.

In an embodiment of the present disclosure, based on the above solution, the apparatus also includes an item information display unit, configured to display item information corresponding to the target item on the region associated with the target item.

In an embodiment of the present disclosure, based on the above solution, the apparatus also includes a target special effect display unit, configured to display a target special effect for the interactive response region.

In an embodiment of the present disclosure, based on the above solution, the apparatus also includes: a voice information receiving unit, configured to receive voice information of a live streamer, and detect an item keyword in the voice information; an item keyword detection unit, configured to trigger the interactive interface corresponding to the target item when an item keyword corresponding to the target item is detected.

The interactive control apparatus for the virtual live-streaming room provided by the present disclosure may compare the live-streaming screen with the pre-stored item image to acquire the image matching result, and according to the image matching result, the interactive response region is created, in response to the interactive operation on the interactive response region, and the interactive interface corresponding to the target item is triggered. On the one hand, the operation of the live streamer may be simplified, and it is unnecessary to pay attention to the link status of the item, so as to reduce the time consumption of the live streamer in introducing the product link, thereby improving a product promotion efficiency of the live streamer, and thus enhancing the experience of the live streamer; on the other hand, the audience does not need to pay continuous attention to the real-time status of the link, such that the audience may focus on the live streamer's introduction to the item without searching for a required link among the plurality of links, which greatly saves the time consumption of the audience; moreover, the audience may complete the purchase of the item in the virtual live-streaming room, so as to avoid the separation between the live-streaming scene and the purchase scene, thereby improving the use experience of the audience and thus increasing the purchasing desire of the audience.

Since each functional module of the interactive control apparatus for the virtual live-streaming room of the embodiment of the present disclosure corresponds to the steps of the above embodiment of the interactive control method for the virtual live-streaming room, as for details not disclosed in the apparatus embodiment of the present disclosure, please refer to the embodiments of the interactive control method for the virtual live-streaming room described above in the present disclosure.

It should be noted that, although several modules or units of devices for action execution are mentioned in the detailed description above, such division is not mandatory. Indeed, according to embodiments of the present disclosure, the features and functions of two or more modules or units described above may be embodied in one module or unit. Conversely, the features and functions of one of the modules or units described above may be further divided into a plurality of modules or units to embody.

In addition, in an embodiment of the present disclosure, an electronic device capable of implementing the above interactive control method for the virtual live-streaming room is also provided.

Those skilled in the art is able to understand that various aspects of the present disclosure may be implemented as a system, method, or program product. Thus, various aspects of the present disclosure may be embodied in the following forms: a complete hardware implementation, a complete software implementation (including firmware, microcode, etc.), or a combination of hardware and software, which may be collectively referred to as "circuit", "module', or "system".

Figure 10:
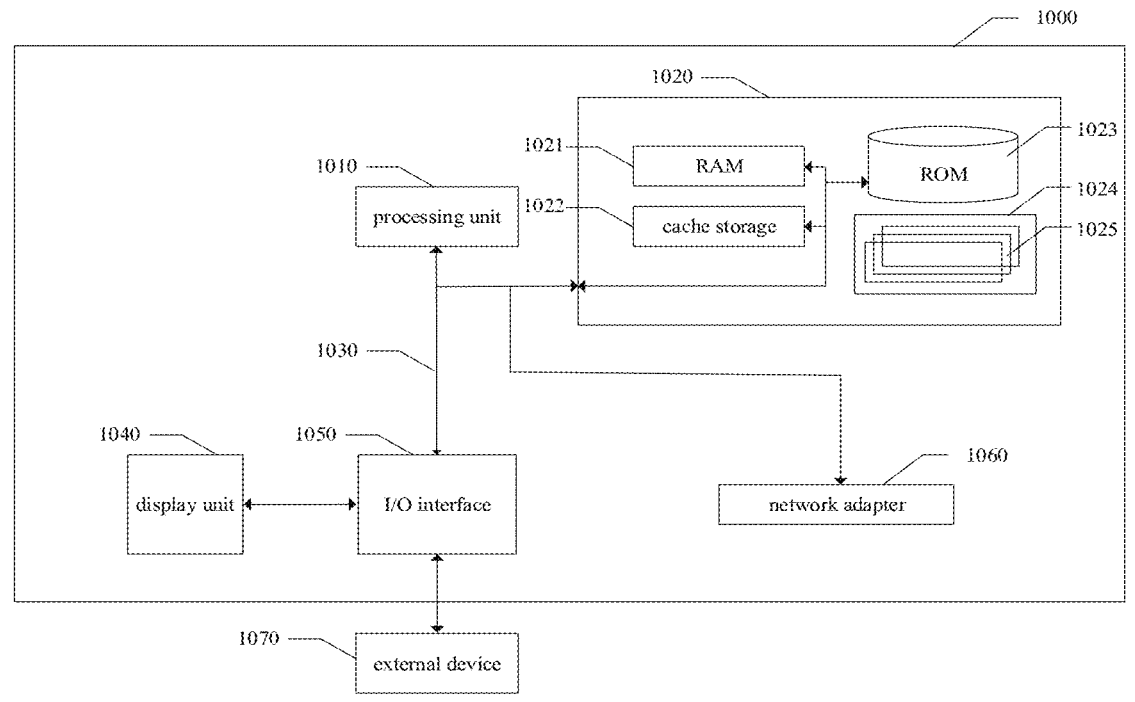
FIG. 10 schematically shows a structural diagram of a computer system suitable for implementing an electronic device of an embodiment of the present disclosure.

An electronic device 1000 according to an embodiment of the present disclosure is described below with reference to FIG. 10. The electronic device 1000 shown in FIG. 10 is only an example, and should not limit the functions and scope of use of the embodiments of the present disclosure.

As shown in FIG. 1, the electronic device 1000 is shown in the form of a general-purpose computing device. The components of the electronic device 1000 may include, but are not limited to, at least one processing unit 1010, at least one storage unit 1020, a bus 1030 connecting different system components (including the storage unit 1020 and the processing unit 1010), and a display unit 1040.

The storage unit stores program codes, and the program codes may be executed by the processing unit 1010, such that the processing unit 1010 executes various embodiments according to the present disclosure described in the "exemplary methods" section of the present specification. For example, the processing unit 1010 may perform the steps shown in FIG. 2: in step S210: a live-streaming screen of the virtual live-streaming room is provided on a graphical user interface; in step S220: an image matching result is acquired, where the image matching result is a result acquired by comparing the live-streaming screen with a pre-stored item image; in step S230: a target item successfully matched in the live-streaming screen is determined according to the image matching result; in step S240: a region associated with the target item in the live-streaming screen is set as an interactive response region; in step S250: in response to an interactive operation on the interactive response region, an interactive interface corresponding to the target item is triggered.

In an embodiment of the present disclosure, a live-streaming screen of a virtual live-streaming room is provided on a graphical user interface; an image matching result is acquired, the image matching result is a result acquired by comparing the live-streaming screen with a pre-stored item image; according to the image matching result, a target item successfully matched in the live-streaming screen is determined; a region associated with the target item in the live-streaming screen is set as an interactive response region; in response to an interactive operation on the interactive response region, an interactive interface corresponding to the target item is triggered.

In an embodiment of the present disclosure, based on the above solution, the virtual live-streaming room is correspondingly provided with a live streamer side client and before acquiring the image matching result, where the image matching result is a result acquired by comparing the live-streaming screen with the pre-stored item image, the method also includes: in response to an upload operation for an item image, uploading, by the live streamer side client, the item image.

In an embodiment of the present disclosure, based on the above solution, the method also includes: in response to the upload operation for item information and/or an item link corresponding to the item image, uploading, by the live streamer side client, the item information and/or the item link corresponding to the item image.

In an embodiment of the present disclosure, based on the above solution, acquiring the image matching result include: acquiring a matching degree by matching an image corresponding to a partial region in the live-streaming screen with the pre-stored item image; when the matching degree is greater than or equal to a preset matching threshold, determining the partial region as the image matching result.

In an embodiment of the present disclosure, based on the above solution, determining the target item successfully matched in the live-streaming screen according to the image matching result includes: determining a target region successfully matched with an item image in the live-streaming screen according to the image matching result; determining an item included in the target region, and determining the item included in the target region as the target item successfully matched in the live-streaming screen.

In an embodiment of the present disclosure, based on the above solution, the interactive interface is a purchase interface for purchasing the target item.

In an embodiment of the present disclosure, based on the above solution, after triggering the interactive interface corresponding to the target item, the method also includes: in response to a trigger operation for the interactive interface, displaying a purchase interface for the target item.

In an embodiment of the present disclosure, based on the above solution, the region associated with the target item is a region occupied by the target item in the live-streaming screen.

In an embodiment of the present disclosure, based on the above solution, item information corresponding to the target item is displayed on the region associated with the target item.

In an embodiment of the present disclosure, based on the above solution, the method also includes: displaying a target special effect for the interactive response region.

In an embodiment of the present disclosure, based on the above solution, the method also includes: receiving voice information of a live streamer, and detecting an item keyword in the voice information; when an item keyword corresponding to the target item is detected, triggering the interactive interface corresponding to the target item.

The electronic device provided by the present disclosure may compare the live-streaming screen with the pre-stored item image to acquire the image matching result, and according to the image matching result, the interactive response region is created, in response to the interactive operation on the interactive response region, and the interactive interface corresponding to the target item is triggered. On the one hand, the operation of the live streamer may be simplified, and it is unnecessary to pay attention to the link status of the item, so as to reduce the time consumption of the live streamer in introducing the product link, thereby improving a product promotion efficiency of the live streamer, and thus enhancing the experience of the live streamer; on the other hand, the audience does not need to pay continuous attention to the real-time status of the link, such that the audience may focus on the live streamer's introduction to the item without searching for a required link among the plurality of links, which greatly saves the time consumption of the audience; moreover, the audience may complete the purchase of the item in the virtual live-streaming room, so as to avoid the separation between the live-streaming scene and the purchase scene, thereby improving the use experience of the audience and thus increasing the purchasing desire of the audience.

The storage unit 1020 may include a readable medium in the form of a volatile storage unit, such as a random access storage unit (RAM) 1021 and/or a cache storage unit 1022, and may further include a read-only storage unit (ROM) 1023.

The storage unit 1020 may further include a program/utility tool 1024 having a. set of (at least one) program modules 1025. Such program modules 1025 include, but are not limited to, an operating system, one or more application programs, other program modules, and program data. Each or some combination of these examples may include an implementation of a network environment.

The bus 1030 may be one or more of several types of bus structures, including a storage unit bus or a storage unit controller, a peripheral bus, a graphics acceleration port, a processing unit, or a local bus that uses any of the bus structures in a variety of bus structures.

The electronic device 1000 may also communicate with one or more external devices 1070 (such as a keyboard, pointing device, blue tooth device, and the like), may also communicate with one or more devices that enable a user to interact with the electronic device 1000, and/or with any device (such as router, modem, and the like) that enables the electronic device 1000 to communicate with one or more other computing devices. This communication may be performed through an input/output (I/O) interface 1050. Moreover, the electronic device 1000 may also communicate with one or more networks (such as a local area network (LAN), a wide area network (WAN), and/or a public network, such as the Internet) through the network adapter 1060. As shown, the network adapter 1060 communicates with other modules of the electronic device 1000 through the bus 1030. It should be understood that although not shown in the drawings, other hardware and/or software modules may be used in conjunction with the electronic device 1000, including but not limited to: microcode, device drivers, redundant processing units, external disk drive arrays, RAID systems, tape drives and data backup storage systems, and so on.

Through the description of the above embodiments, those skilled in the art will readily understand that the embodiments described here may be implemented by software or by software in combination with necessary hardware. Thus, the technical solution according to the embodiments of the present disclosure may be embodied in a form of software product, which may be stored in a non-volatile storage medium (which may be a CD-ROM, a USB flash drive, a mobile hard disk, and the like) or on a network, including a number of instructions to make a computing device (which may be a personal computer, a server, a terminal apparatus, or a network device, and the like) to perform the methods according to embodiments in the present disclosure.

In an embodiment of the present disclosure, there is also provided a computer-readable storage medium on which a program product capable of implementing the above-mentioned method of the present specification is stored. In some possible implementation manners, aspects of the present disclosure may also be implemented in the form of a program product, which includes program code. When the program product runs on a terminal device, the program code is used to make the terminal device perform the steps according to various embodiments of the present disclosure described in the above-mentioned "exemplary method" section of this specification.

In an embodiment of the present disclosure, a live-streaming screen of a virtual live-streaming room is provided on a graphical user interface; an image matching result is acquired, the image matching result is a result acquired by comparing the live-streaming screen with a pre-stored item image; according to the image matching result, a target item successfully matched in the live-streaming screen is determined; a region associated with the target item in the live-streaming screen is set as an interactive response region; in response to an interactive operation on the interactive response region, an interactive interface corresponding to the target item is triggered.

In an embodiment of the present disclosure, based on the above solution, the virtual live-streaming room is correspondingly provided with a live streamer side client and before acquiring the image matching result, where the image matching result is a result acquired by comparing the live-streaming screen with the pre-stored item image, the method also includes: in response to an upload operation for an item image, uploading, by the live streamer side client, the item image.

In an embodiment of the present disclosure, based on the above solution, the method also includes: in response to the upload operation for item information and/or an item link corresponding to the item image, uploading, by the live streamer side client, the item information and/or the item link corresponding to the item image.

In an embodiment of the present disclosure, based on the above solution, acquiring the image matching result include: acquiring a matching degree by matching an image corresponding to a partial region in the live-streaming screen with the pre-stored item image; when the matching degree is greater than or equal to a preset matching threshold, determining the partial region as the image matching result.

In an embodiment of the present disclosure, based on the above solution, determining the target item successfully matched in the live-streaming screen according to the image matching result includes: determining a target region successfully matched with an item image in the live-streaming screen according to the image matching result; determining an item included in the target region, and determining the item included in the target region as the target item successfully matched in the live-streaming screen.

In an embodiment of the present disclosure, based on the above solution, the interactive interface is a purchase interface for purchasing the target item.

In an embodiment of the present disclosure, based on the above solution, after triggering the interactive interface corresponding to the target item, the method also includes: in response to a trigger operation for the interactive interface, displaying a purchase interface for the target item.

In an embodiment of the present disclosure, based on the above solution, the region associated with the target item is a region occupied by the target item in the live-streaming screen.

In an embodiment of the present disclosure, based on the above solution, item information corresponding to the target item is displayed on the region associated with the target item.

In an embodiment of the present disclosure, based on the above solution, the method also includes: displaying a target special effect for the interactive response region.

In an embodiment of the present disclosure, based on the above solution, the method also includes: receiving voice information of a live streamer, and detecting an item keyword in the voice information; when an item keyword corresponding to the target item is detected, triggering the interactive interface corresponding to the target item.

The non-transitory computer-readable storage medium provided by the present disclosure may compare the live-streaming screen with the pre-stored item image to acquire the image matching result, and according to the image matching result, the interactive response region is created, in response to the interactive operation on the interactive response region, and the interactive interface corresponding to the target item is triggered. On the one hand, the operation of the live streamer may be simplified, and it is unnecessary to pay attention to the link status of the item, so as to reduce the time consumption of the live streamer in introducing the product link, thereby improving a product promotion efficiency of the live streamer, and thus enhancing the experience of the live streamer; on the other hand, the audience does not need to pay continuous attention to the real-time status of the link, such that the audience may focus on the live streamer's introduction to the item without searching for a required link among the plurality of links, which greatly saves the time consumption of the audience; moreover, the audience may complete the purchase of the item in the virtual live-streaming room, so as to avoid the separation between the live-streaming scene and the purchase scene, thereby improving the use experience of the audience and thus increasing the purchasing desire of the audience.

The non-transitory computer-readable signal medium may include a data signal in baseband or propagated as a part of a carrier wave, which carries readable program code. Such a propagated data signal may take many forms, including but not limited to electromagnetic signals, optical signals, or any suitable combination of the foregoing. The readable signal medium may also be any readable medium other than a readable storage medium, and the readable medium may send, propagate, or transmit a program for use by or in combination with an instruction execution system, apparatus, or device.

The program code contained on the readable medium may be transmitted using any appropriate medium, including but not limited to wireless, wired, optical fiber cable, RF, and the like, or any suitable combination of the foregoing.

The program code for performing the operations of the present disclosure may be written in any combination of one or more program design languages, which include object-oriented program design languages, such as Java, C.++, and the like, and further include conventional procedural program design language, such as "C" or a similar program design language. The program code may be executed entirely or partly on the user computing device, may be executed as an independent software package, may be executed partly on the user computing device and partly on the remote computing device, or may be executed entirely on the remote computing device or server. In the case of a remote computing device, the remote computing device may be connected to the user computing device via any kind of network, such as a local area network (LAN) or a wide area network (WAN), or it may be connected to external computing devices, for example, connected to external computing devices via the Internet by use of an Internet service provider.

In addition, the above-mentioned drawings are merely a schematic description of processes included in methods according to the embodiments of the present disclosure, and are not intended to limit the present disclosure. It is easy to understand that the processes shown in the above drawings does not indicate or limit the chronological order of these processes. In addition, it is also easy to understand that these processes may be performed synchronously or asynchronously in multiple modules, for example.

Other embodiments of the present disclosure will be apparent to those skilled in the art after consideration of the specification and practice of the present disclosure disclosed here. The present disclosure is intended to cover any variations, uses, or adaptive changes of the present disclosure, which are in accordance with the general principles of the disclosure and include common general knowledge or common technical means in the art that are not disclosed in the present disclosure. The specification and embodiments are deemed to be exemplary only and the true scope and spirit of the present disclosure are indicated by the claims.

What is claimed is:

1. An interactive control method for a virtual live-streaming room, comprising:

providing a live-streaming screen of the virtual live-streaming room on a graphical user interface;

acquiring a pre-stored item image corresponding to an item of the virtual live-streaming room;

preprocessing the pre-stored item image;

acquiring a matching degree by comparing an image corresponding to a partial region in the live-streaming screen with the pre-stored item image based on a grayscale matching algorithm or a feature matching algorithm;

in response to determining that the matching degree is greater than or equal to a preset matching threshold, determining the partial region as an image matching result; wherein the image matching result is a result acquired by comparing the live-streaming screen with a pre-stored item image;

determining a target item successfully matched in the live-streaming screen according to the image matching result; wherein the target item is displayed in the live-streaming screen, and the target item is an item in a region, of the live-streaming screen, matched with the pre-stored item image;

setting a region occupied by the target item in the live-streaming screen as an interactive response region; and in response to an interactive operation on the interactive response region, triggering an interactive interface corresponding to the target item.

2. The method according to claim 1, wherein the virtual live-streaming room is correspondingly provided with a live streamer side client, and the method further comprises:

in response to an upload operation for an item image, uploading, by the live streamer side client, the item image.

3. The method according to claim 2, further comprising:

in response to the upload operation for at least one of item information or an item link corresponding to the item image, uploading, by the live streamer side client, the at least one of the item information or the item link corresponding to the item image.

4. The method according to claim 1, wherein determining the target item successfully matched in the live-streaming screen according to the image matching result comprises:

determining a target region successfully matched with the pre-stored item image in the live-streaming screen according to the image matching result; and determining an item included in the target region, and determining the item included in the target region as the target item successfully matched in the live-streaming screen.

5. The method according to claim 1, wherein the interactive interface comprises a purchase interface for purchasing the target item.

6. The method according to claim 1, further comprising:

in response to a trigger operation for the interactive interface, displaying a purchase interface for the target item.

7. The method according to claim 1, further comprising:

displaying item information corresponding to the target item on the region associated with the target item.

8. The method according to claim 1, further comprising:

displaying a target special effect for the interactive response region.

9. The method according to claim 1, further comprising:

receiving voice information of a live streamer, and detecting an item keyword in the voice information;

in response to detecting an item keyword corresponding to the target item, triggering the interactive interface corresponding to the target item.

10. A non-transitory computer-readable storage medium having a computer program stored thereon, wherein when performing the computer program, a processor is configured to:

provide a live-streaming screen of a virtual live-streaming room on a graphical user interface;

acquire a pre-stored item image corresponding to an item of the virtual live-streaming room;

preprocess the pre-stored item image;

acquire a matching degree by comparing an image corresponding to a partial region in the live-streaming screen with the pre-stored item image based on a grayscale matching algorithm or a feature matching algorithm;

in response to determining that the matching degree is greater than or equal to a preset matching threshold, determine the partial region as an image matching result, wherein the image matching result is a result acquired by comparing the live-streaming screen with a pre-stored item image;

determine a target item successfully matched in the live-streaming screen according to the image matching result; wherein the target item is displayed in the live-streaming screen, and the target item is an item in a region, of the live-streaming screen, matched with the pre-stored item image;

set a region occupied by the target item in the live-streaming screen as an interactive response region; and in response to an interactive operation on the interactive response region, trigger an interactive interface corresponding to the target item.

11. An electronic device, comprising:

a processor; and a memory, configured to store one or a plurality of programs, when performing the one or the plurality of programs, the processor is configured to:

provide a live-streaming screen of a virtual live-streaming room on a graphical user interface;

acquire a pre-stored item image corresponding to an item of the virtual live-streaming room;

preprocess the pre-stored item image;

acquire a matching degree by comparing an image corresponding to a partial region in the live-streaming screen with the pre-stored item image based on a grayscale matching algorithm or a feature matching algorithm;

in response to determining that the matching degree is greater than or equal to a preset matching threshold, determine the partial region as an image matching result, wherein the image matching result is a result acquired by comparing the live-streaming screen with a pre-stored item image;

determine a target item successfully matched in the live-streaming screen according to the image matching result; wherein the target item is displayed in the live-streaming screen, and the target item is an item in a region, of the live-streaming screen, matched with the pre-stored item image;

set a region occupied by the target item in the live-streaming screen as an interactive response region; and in response to an interactive operation on the interactive response region, trigger an interactive interface corresponding to the target item.

12. The electronic device according to claim 11, wherein the virtual live-streaming room is correspondingly provided with a live streamer side client, and the process is further configured to:

in response to an upload operation for an item image, upload, by the live streamer side client, the item image.

13. The electronic device according to claim 12, wherein the process is further configured to:

in response to the upload operation for at least one of item information or an item link corresponding to the item image, upload, by the live streamer side client, the at least one of the item information or the item link corresponding to the item image.

14. The electronic device according to claim 11, wherein the process is further configured to:

determine a target region successfully matched with the pre-stored item image in the live-streaming screen according to the image matching result; and determine an item included in the target region, and determine the item included in the target region as the target item successfully matched in the live-streaming screen.

15. The non-transitory computer-readable storage medium according to claim 10, wherein the process is further configured to:

in response to a trigger operation for the interactive interface, display a purchase interface for the target item.

16. The non-transitory computer-readable storage medium according to claim 10, wherein the process is further configured to:

display item information corresponding to the target item on the region associated with the target item.

17. The non-transitory computer-readable storage medium according to claim 10, wherein the processor is further configured to:

receive voice information of a live streamer, and detect an item keyword in the voice information;

in response to detecting an item keyword corresponding to the target item, trigger the interactive interface corresponding to the target item.

18. The method according to claim 1, wherein the virtual live-streaming room is correspondingly provided with a live streamer side client, and the preset matching threshold is input by the live streamer side client.

* * * * *